United States Patent
Ihm et al.

(10) Patent No.: US 7,852,954 B2
(45) Date of Patent: Dec. 14, 2010

(54) METHOD OF TRANSMITTING DATA AND ESTIMATING CHANNEL INFORMATION IN OFDM/OFDMA MOBILE COMMUNICATIONS SYSTEM

(75) Inventors: Bin Chul Ihm, Gyeonggi-do (KR); Yong Suk Jin, Gyeonggi-do (KR); Jin Young Chun, Seoul (KR)

(73) Assignee: LG Electronics, Inc., Seoul (KR)

( * ) Notice: Subject to any disclaimer, the term of this patent is extended or adjusted under 35 U.S.C. 154(b) by 638 days.

(21) Appl. No.: 11/576,440

(22) PCT Filed: Sep. 30, 2005

(86) PCT No.: PCT/KR2005/003253
§ 371 (c)(1),
(2), (4) Date: Mar. 30, 2007

(87) PCT Pub. No.: WO2006/036053
PCT Pub. Date: Apr. 6, 2006

(65) Prior Publication Data
US 2007/0217539 A1   Sep. 20, 2007

(30) Foreign Application Priority Data

Sep. 30, 2004 (KR) .................. 10-2004-0077936
Oct. 1, 2004 (KR) .................. 10-2004-0078301

(51) Int. Cl.
*H04K 1/10* (2006.01)
*H04L 27/28* (2006.01)
*H04L 27/00* (2006.01)
*H04L 5/12* (2006.01)
*H04L 23/02* (2006.01)
*H04L 1/02* (2006.01)
*H04B 7/12* (2006.01)

(52) U.S. Cl. .................. 375/260; 375/259; 375/261; 375/262; 375/263; 375/264; 375/265; 375/267; 375/268; 375/269; 375/270

(58) Field of Classification Search ......... 370/200–210; 375/259–270
See application file for complete search history.

(56) References Cited

U.S. PATENT DOCUMENTS 7,542,439 B2 * 6/2009 Rubin .................. 370/315

(Continued)

FOREIGN PATENT DOCUMENTS

| WO | WO 02/49305 A2 | 6/2002 |
| WO | WO 03/034646 A2 | 4/2003 |
| WO | 2004/008662 | 1/2004 |

OTHER PUBLICATIONS

Kaitz, T. et al. "Channel Estimation and Feedback Report for OFDM AAS", IEEE C802.16d-04/35r1, IEEE 802.16 Broadband Wireless Access Working Group [online], Mar. 17, 2004 [retrieved on Feb. 6, 2007]. Retrieved from the Internet: <URL:http://www.ieee802.org/16/tgd/contrib/C80216d-04_35r1.pdf>. pp. 2-6.

(Continued)

*Primary Examiner*—David C Payne
*Assistant Examiner*—Erin M File
(74) *Attorney, Agent, or Firm*—Lee, Hong, Degerman, Kang & Waimey

(57) ABSTRACT

A method of feeding back channel information in an OFDM or OFDMA radio communications system is disclosed, in which a transmitting side instructs a region for measuring a downlink channel status and in which a receiving side feeds back the channel information to the transmitting side. The present invention includes the steps of transmitting instruction information instructing at least one region of at least two regions within a data frame as a signal measurement region to a receiving side and receiving the channel information estimated by a signal included in the signal measurement region instructed by the instruction information from the receiving side.

14 Claims, 5 Drawing Sheets

U.S. PATENT DOCUMENTS

| | | | |
|---|---|---|---|
| 2002/0188723 A1* | 12/2002 | Choi et al. | 709/225 |
| 2005/0232136 A1* | 10/2005 | Kwak | 370/208 |
| 2006/0029017 A1* | 2/2006 | Mudulodu et al. | 370/328 |
| 2006/0067441 A1* | 3/2006 | Park et al. | 375/346 |
| 2007/0081602 A1* | 4/2007 | Tanaka et al. | 375/260 |
| 2007/0274253 A1* | 11/2007 | Zhang et al. | 370/328 |

OTHER PUBLICATIONS

Kaitz, T. et al. "Channel Estimation and Feedback Report for OFDM AAS", IEEE C802.16d-04/06, IEEE 802.16 Broadband Wireless Access Working Group [online], Jan. 12, 2004 [retrieved on Feb. 6, 2007]. Retrieved from the Internet: <URL:http://www.ieee802.org/I6/tgd/contrib/C80216d-04_06.pdf>. pp. 1, 2.

Leiba, Y. et al. "Optional Midamble for OFDM Mode", IEEE C802.16d-03/75, IEEE 802.16 Broadband Wireless Access Working Group [online], (Nov. 4, 2003) [retrieved on Feb. 6, 2007]. Retrieved from the Internet: <URL:http://www.ieee802.org/I6/tgd/contrib/C80216d-03_75.pdf>. pp. 1, 2.

Roh, W. et al. "An Efficient CQICH Signaling for MIMO OFDMA", IEEE C802.16e-04/362r3, IEEE 802.16 Broadband Wireless Access Working Group [online ], (Sep. 1, 2004) [retrieved on Feb. 6, 2007]. Retrieved from the Internet: <URL:http://www.ieee802.org/16/tge/contrib/C80216e-04_362r3.pdf>. section 2.

* cited by examiner

METHOD OF TRANSMITTING DATA AND ESTIMATING CHANNEL INFORMATION IN OFDM/OFDMA MOBILE COMMUNICATIONS SYSTEM

CROSS-REFERENCE TO RELATED APPLICATIONS

Pursuant to 35 U.S.C. §119(a), this application claims the benefit of earlier filing date and right of priority to International Application No. PCT/KR05/03253, filed on Sep. 30, 2005, to Korean Application No. 10-2004-0078301, filed on Oct. 1, 2004, and to Korean Application No. 10-2004-0077936, filed on Sep. 30, 2004, the contents of all of which are hereby incorporated by reference herein in their entirety.

TECHNICAL FIELD

The present invention relates to an OFDM (orthogonal frequency division multiplexing) or OFDMA (orthogonal frequency division multiple access) wireless communications system, and more particularly, to a method of feeding back channel information in an OFDM or OFDMA wireless communications system.

BACKGROUND ART

Recently, many efforts are actively made to research and develop OFDM (orthogonal frequency division multiplexing) or OFDMA (orthogonal frequency division multiplexing access) that is suitable for high-speed data transmission over wire/wireless channel. In OFDM, frequency use efficiency is raised using a plurality of carrier waves having mutual orthogonality. A process of modulating/demodulating a plurality of the carrier waves in a transmitting/receiving has the same result of performing IDFT (inverse discrete Fourier transform)/DFT (discrete Fourier transform) and can be implemented at high speed using IFFT (inverse fast Fourier transform)/FFT (fast Fourier transform).

A principle of the OFDM is to reduce relative dispersion in a time domain by multi-path delay spread in a manner of increasing a symbol duration by dividing a high-speed data stream into a plurality of low-speed data streams and by simultaneously transmitting a plurality of the low-speed data streams using a plurality of subcarriers. And, a transmission of data by the OFDM uses a transmission symbol as a unit.

Since the modulation/demodulation in the OFDM can be collectively handled for the entire subcarriers using DFT (discrete Fourier transform), it is unnecessary to design a modulator/demodulator for each of the individual subcarriers.

FIG. 1 is a diagram of a conceptional configuration of an OFDM modulator/demodulator.

Referring to FIG. 1, a serially inputted data stream is transformed into parallel data streams amounting to the number of subcarriers. Inverse discrete Fourier transform (IDFT) is carried out on each of the parallel data streams. For a fast data processing, IFFT (inverse fast Fourier transform) is used. The inverse-Fourier-transformed data is converted to serial data again to be transmitted through frequency conversion. A receiving side receives the corresponding signal to demodulate through a reverse process.

In an OFDM radio communications system according to a related art, a preamble signal inserted in a data frame in a uniform cycle is used as a means for tuning time synchronization and frequency synchronization between a base station and a mobile subscriber station.

FIG. 2 is an exemplary diagram of a data frame in an OFDMA radio communications system according to a related art. In FIG. 2, a horizontal axis is a time axis represented as a symbol unit and a vertical axis is a frequency axis represented as a unit of subchannel. And, the subchannel means a bundle of a plurality of subcarriers.

Referring to FIG. 2, all subcarriers are allocated to a preamble to be modulated and are inserted in the preamble with a uniform interval. Hence, the preamble becomes a reference point of a whole time. Since all signals exchanged between a base station and a mobile subscriber station are inserted by taking the preamble as a reference, acquisition of the preamble is the most basic and important process in exchanging data. A midamble, as shown in FIG. 2, is inserted in the middle of a data frame used in the MIMO (multi-input multi-output) system employing a plurality of antennas for data transmission to play a role similar to that of the preamble.

MIMO is the technology that enables an expectation of remarkable enhancement of frequency efficiency and network link capacity using a plurality of antennas in both transmitting and receiving sides. Recently, attention is paid to the MIMI as an important technology of the mobile communications system demanding for fast data transfer. As a representative MIMO system, there is a BLAST (Bell Laboratory Layered Space-Time) type that can be classified into V-BLAST (vertical-BLAST), H-BLAST (Horizontal-BLAST), D-BLAST (Diagonal-BLAST) and the like.

In the MIMO system, if a transmitting side transmits data to a receiving side via a plurality of antennas, the receiving side receives the transmitted data and estimates channel information per channel. The receiving side finds a weight using the estimated channel information and then feeds back the weight to the transmitting side. The transmitting side applies the fed-back weight to input data to be able to transmit the input data to the receiving side more accurately.

Meanwhile, in the related art OFDM or OFDMA radio communications system, if data to be transmitted to a mobile subscriber station exists, a base station allocates a data region to be transmitted using DL-MAP (download-MAP). The mobile subscriber station receives data via the allocated region (part-'A' in FIG. 2). The base station allocates a region (part-'B' in FIG. 2) for receiving a feedback of a measured value for a downlink channel status from the mobile subscriber station and designates a channel quality information channel (CQICH). A base station using a multi transmitting antenna designates such information to be fed back as per-channel channel quality, antenna weight, multi-antenna mode selection, permutation selection and the like.

In the related art, in order for the receiving side to estimate the channel information, there exist various reference signals. And, a pilot signal is placed in each predetermined region to enable the receiving side to estimate the channel information. Hence, if the transmitting side transmits data to the receiving side, the receiving side estimates the channel information using the pilot of the data region allocated to itself. The above-explained related art just provides various reference signals (preamble, pilot, data subcarrier, etc.) enabling the estimation of channel information but fails in clearing the information indicating what reference signal or what region will be measured. A channel estimation value may vary according to what reference signal is measured due to various boosting levels, cell loading and frequency reuse factor. In case of the system employing MIMO, as the MIMO midamble is added so that a receiving side enables channel estimation of the midamble as well as a data region allocated to itself, which is not taken into consideration by the related art.

Since the base station preferentially transmits the data to be transmitted to the mobile subscriber station via a non-allocated downlink region without considering a channel status of the mobile subscriber station, data throughput is lowered in case of a poor channel status. Hence, the data region (part-'A' in FIG. 2) should be re-selected to transmit via several feedbacks.

DISCLOSURE OF THE INVENTION

Accordingly, the present invention is directed to a method of feeding back channel information in an OFDM or OFDMA radio communications system that substantially obviate one or more of the problems due to limitations and disadvantages of the related art.

An object of the present invention is to provide a method of feeding back channel information in an OFDM or OFDMA radio communications system, in which a transmitting side instructs a region for measuring a downlink channel status and in which a receiving side feeds back the channel information to the transmitting side.

Another object of the present invention is to provide a method of feeding back channel information in an OFDM or OFDMA radio communications system, by which a signal measuring region can be flexibly designated according to a situation in a system (e.g., MIMO system, adaptive beamforming system, etc.) that employs an antenna affected by a variation of a region for channel information estimation.

Another object of the present invention is to provide a method of feeding back channel information in an OFDM or OFDMA radio communications system, by which data can be more efficiently transmitted by easing accuracy of estimated channel information.

A further object of the present invention is to provide a method of feeding back channel information in an OFDM or OFDMA radio communications system, in which a mobile subscriber station (MSS) feeds back a channel status of a data transfer band assigned to data transmission to a base station to device whether to perform the data transmission and by which reception quality of data to be transmitted can be enhanced.

In the present invention, a transmitting side instructs a signal measurement region for downlink channel estimation of a receiving side. The receiving side measures or estimates channel information based on a signal included in the signal measurement region. The channel information estimated according to a request of the transmitting side is fed back to the transmitting side. The channel quality measurement region corresponds to a portion or all of a preamble region, a portion or all of a midamble region in a MIMO system, or a data region allocated to the receiving side. By the above-explained technical configuration, even if there is no channel region allocated to the receiving side, a preamble or midamble is instructed as the signal measurement region so that the receiving side estimates the channel information to feed back to the transmitting side.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in an OFDM (orthogonal frequency division multiplexing) or OFDMA (orthogonal frequency division multiple access) wireless communications system, a method of feeding back channel information according to the present invention includes the steps of transmitting instruction information instructing at least one region of at least two regions within a data frame as a signal measurement region to a receiving side and receiving the channel information estimated by a signal included in the signal measurement region instructed by the instruction information from the receiving side.

To further achieve these and other advantages and in accordance with the purpose of the present invention, in an OFDM (orthogonal frequency division multiplexing) or OFDMA (orthogonal frequency division multiple access) wireless communications system, a method of feeding back channel information includes the steps of receiving instruction information instructing at least one region of at least two regions within a data frame as a signal measurement region from a transmitting side, estimating the channel information from a signal included in the signal measurement region instructed by the instruction information, and transmitting the estimated channel information to the transmitting side.

To further achieve these and other advantages and in accordance with the purpose of the present invention, in an OFDM (orthogonal frequency division multiplexing) or OFDMA (orthogonal frequency division multiple access) wireless communications system, a method of feeding back channel information includes the steps of transmitting a channel quality information channel (CQICH) instruction information element (IE) to a mobile subscriber station (MSS), the CQICH IE including instruction information instructing at least one of at least two regions within a data frame as a signal measurement region and a feedback type, and receiving channel information estimated by the MSS according to the feedback type based on a signal included in the signal measurement region instructed by the instruction information.

To further achieve these and other advantages and in accordance with the purpose of the present invention, in a mobile subscriber station (MSS) of an OFDM (orthogonal frequency division multiplexing) or OFDMA (orthogonal frequency division multiple access) wireless communications system, a method of feeding back channel information includes the steps of receiving a channel quality information channel (CQICH) allocating information element (IE) including instruction information instructing at least one of at least two regions within a data frame as a signal measurement region and a feedback type from a base station, estimating the channel information according to the feedback type based on a signal included in the signal measurement region instructed by the instruction information, and transmitting the estimated channel information to the base station.

To further achieve these and other advantages and in accordance with the purpose of the present invention, in an OFDM (orthogonal frequency division multiplexing) or OFDMA (orthogonal frequency division multiple access) wireless communications system, a method of feeding back channel information includes the steps of transmitting instruction information instructing a preamble region or a midamble region in a MIMO system corresponding to a channel band within which data is transmitted to a receiving side, and receiving the channel information estimated based on a quality of a signal included in the preamble or midamble region instructed by the instruction information from the receiving side.

To further achieve these and other advantages and in accordance with the purpose of the present invention, in an OFDM (orthogonal frequency division multiplexing) or OFDMA (orthogonal frequency division multiple access) wireless communications system, a method of feeding back channel information includes the steps of receiving instruction information instructing a preamble region corresponding to a channel band within which data is transmitted or a midamble region in a MIMO system from a transmitting, estimating the channel information based on a signal included in the preamble or midamble region instructed by the instruction information from the receiving side, and transmitting the estimated channel information to the transmitting side.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. The following embodiments are examples of applying the technical features of the present invention to an OFDM or OFDMA broadband wireless access system.

Figure 1:
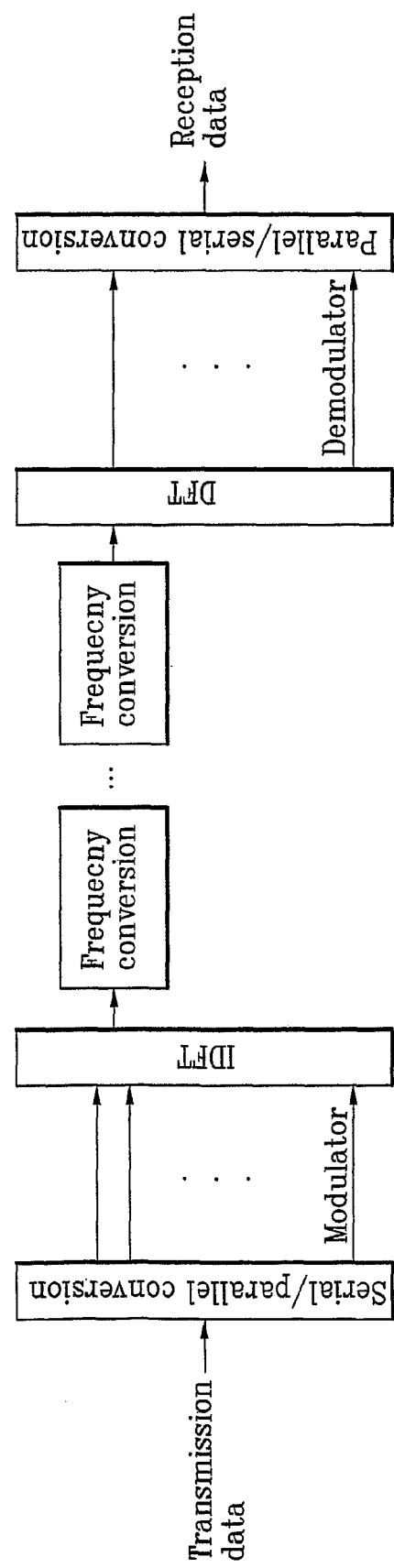
FIG. 1 is a diagram of a conceptional configuration of an OFDM or OFDMA modulator/demodulator.
Figure 2:
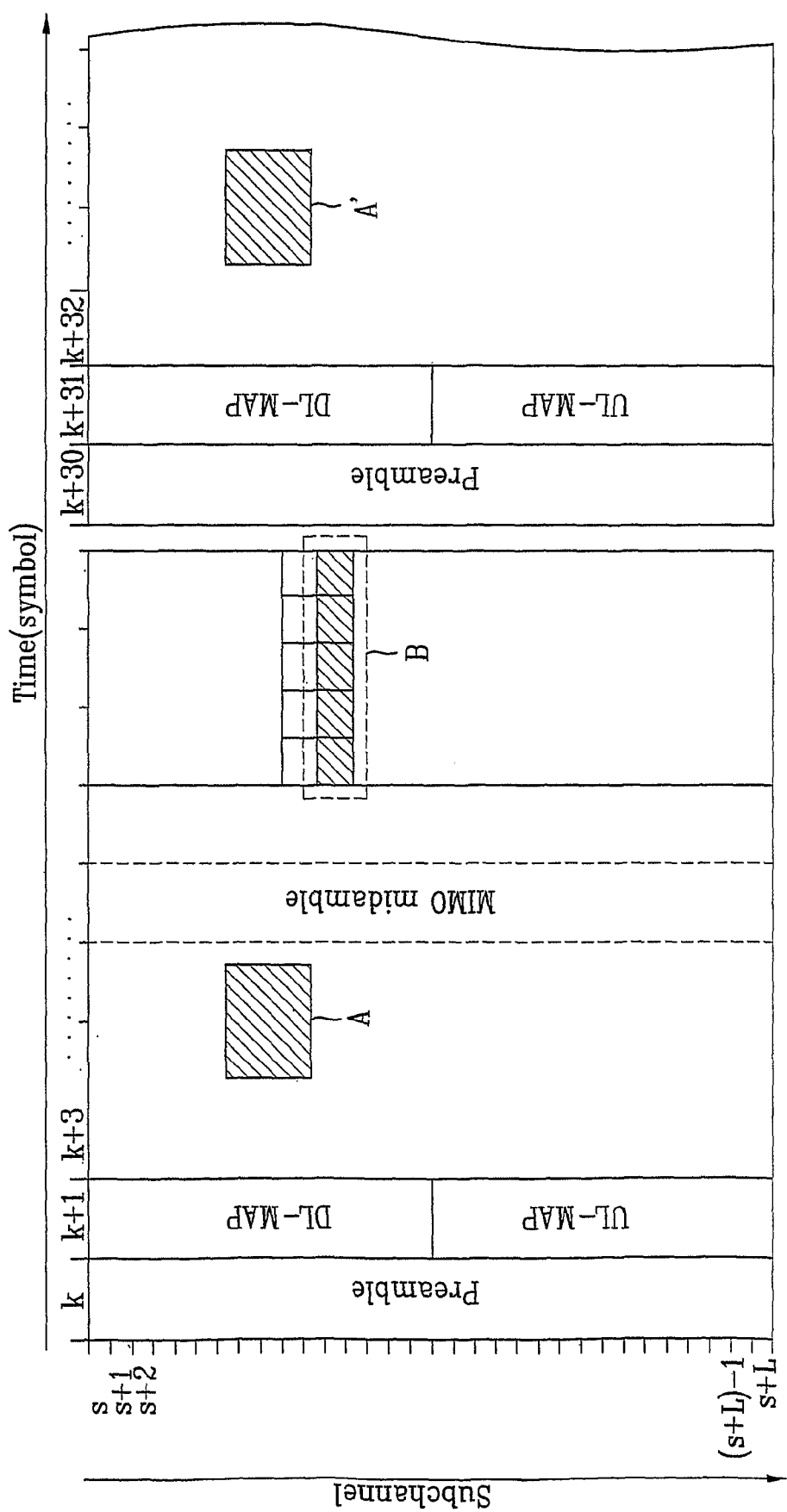
FIG. 2 is an exemplary diagram of a data frame in an OFDM or OFDMA radio communications system according to a related art.

A base station (BS) transmits instruction information, which instructs at least one of at least two regions within a data frame as a signal measurement region, to a mobile subscriber station (MSS). The data frame, as shown in FIG. 2, of an OFDM or OFDMA wireless communications system can be divided into a plurality of regions including a preamble region, a midamble region in a MIMO system, a data region allocated to a receiving side for data transmission, and the like. The instruction information instructs at least one of the plurality of regions as the signal measurement region. In other words, the base station can designate at least one of the preamble region, the midamble region and the data region allocated to the receiving side as a region for measuring a signal quality for the mobile subscriber station.

In case of designating the preamble or midamble region as the signal measurement region, an entire band of the preamble or midamble are can be designated as the signal measurement region or a partial band of the entire band of the preamble or midamble region can be designated as the signal measurement region. Preferably, the partial band corresponds to a channel band for the base station to transmit data to the mobile subscriber station.

In case that the base station designates the partial band of the preamble or midamble region as the signal measurement region, it is preferable that information for designating a range of the partial band is additionally transmitted to the mobile subscriber station.

Figure 5:
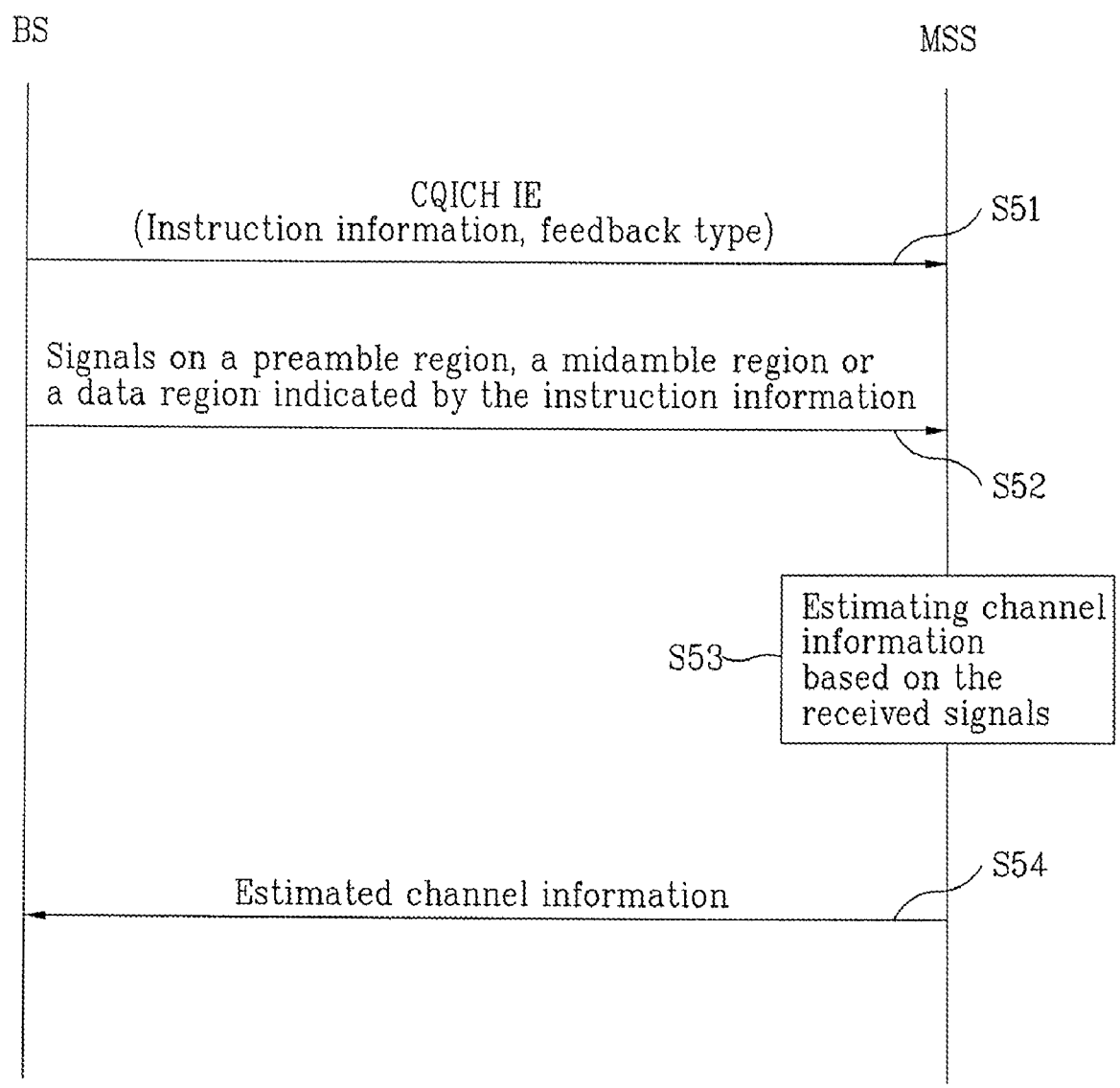
FIG. 5 is a flow diagram according to one embodiment of the present invention.

In the present invention, the instruction information is preferably included in an information element (IE) for allocating CQICH (channel quality information channel) to be transmitted to the mobile subscriber station (see, for example, FIG. 5, S51). The CQICH is a channel assigned by the OFDM or OFDMA broadband wireless access system so that a measurement value for a downlink channel status can be fed back to the base station from the mobile subscriber station. The CQICH includes a 'Feedback type' field therein to instruct the mobile station of a channel information type which is fed back to the base station from the mobile subscriber station.

Table 1 is an example of a data format of the information element (IE) according to one preferred embodiment of the present invention.

TABLE 1

| Syntax | Size (bits) | Notes |
| --- | --- | --- |
| CQICH_Enhanced_Alloc_IE( ) { | | |
| Extended DIUC | 4 | 0x09 |
| Length | 4 | Length in bytes of following fields |
| CQICH_ID | variable | Index to uniquely identify the CQICH resource assigned to the MSS |
| Period(=p) | 2 | A CQI feedback is transmitted on the CQICH every 2^p frames |
| Frame offset | 3 | The MSS starts reporting at the frame of which the number has the same 3 LSB as the specified frame offset. If the current frame is specified, the MSS should start reporting in 8 frames. |
| Duration(=d) | 3 | A CQI feedback is transmitted on the CQI channels indexed by the |

TABLE 1-continued

| Syntax | Size (bits) | Notes |
|---|---|---|
|  |  | CQICH_ID for $10 \times 2^{\hat{}}d$ frames. If d==0, the CQICH is de-allocated. If d==111, the MSS should report until the BS command for the MSS to stop. |
| $N_T$ actual BS antennas | 3 | 001 = Reserved<br>010 = 2 actual antennas<br>011 = 3 actual antennas<br>100 = 4 actual antennas<br>101 = 5 actual antennas<br>110 = 6 actual antennas<br>111 = 7 actual antennas<br>000 = 8 actual antennas |
| Signal for MIMO channel estimation | 1 | 0 = pilots<br>1 = midamble |
| Feedback_type | 4 | 000 = Fast DL measurement/Default Feedback<br>001 = Precoding weight matrix information<br>010 = Channel matrix H<br>011 = MIMO mode and permutation zone<br>100 = Open loop precoding<br>101-111 = Reserved |
| CQICH_Num | 4 | Number of CQICHs assigned to this CQICH_ID is (CQICH_Num + 1) |
| for(I=0;i<CQICH_Num;i++)<br>{<br>Allocation index | 6 | Index to the fast feedback channel region marked by UIUC = 0 |
| }<br>if((Feedback_type!=011)<br>&(!6-bit CQICH)){<br>MIMO_permutation_feedback cycle} | 2 | This field exists only for 4-bit and 5-bit CQI payload.<br>00 = No MIMO and permutation mode feedback<br>01 = the MIMO and permutation mode indication shall be transmitted on the CQICH indexed by the CQICH_ID every 4 frames. The first indications sent on the 8th CQICH frame.<br>10 = the MIMO mode and permutation mode indication shall be transmitted on the CQICH indexed by the CQICH_ID every 8 frames. The first indication is sent on the 8th CQICH frames.<br>11 = the MIMO mode and permutation mode indication shall be transmitted on the CQICH indexed by the CQICH_ID every 16 frames. The first indication is sent on the 16th CQICH frame. |
| CQICH_Num | 4 | Number of CQICHs assigned to this CQICH_ID is (CQICH_Num + 1) |
| for(I=0;i<CQICH_Num;i++)<br>{ |  |  |

Table 1 is an example that it is instructed in the MIMO system whether a mobile subscriber station will measure a signal (e.g., pilot signal) of a data region allocated to itself or a MIMO midamble region by adding a 1-bit 'signal for MIMO estimation' field to a CQICH assignment IE. For another example, by adding a 1-bit 'signal for MIMO estimation' field to a CQICH assignment IE, it is possible to instruct whether to measure and/or estimate a signal of a data region allocated to the mobile subscriber station or to measure a preamble region. For a further example, by adding a 2-bit 'signal for MIMO estimation' field to a CQICH assignment IE, it is possible to instruct whether to measure a signal of a data region allocated to the mobile subscriber station, a preamble region or a midamble region.

In case that the base station designates a partial band of the preamble or midamble region as the signal measurement region, it is able to add 'subchannel offset' and 'No.Subchannels' fields to the IE format for designation of CQICH in Table 1 as an example of the information for designating the range of the partial band. The 'Subchannel offset' field is the information instructing a lowest one of subchannels of the preamble or midamble such as subchannels corresponding to the transmission band for the base station to transmit data and is an index of the lowest subchannel for example. The 'No.Subchannels' field means the number of the subchannels corresponding to the transmission band.

Figure 3:
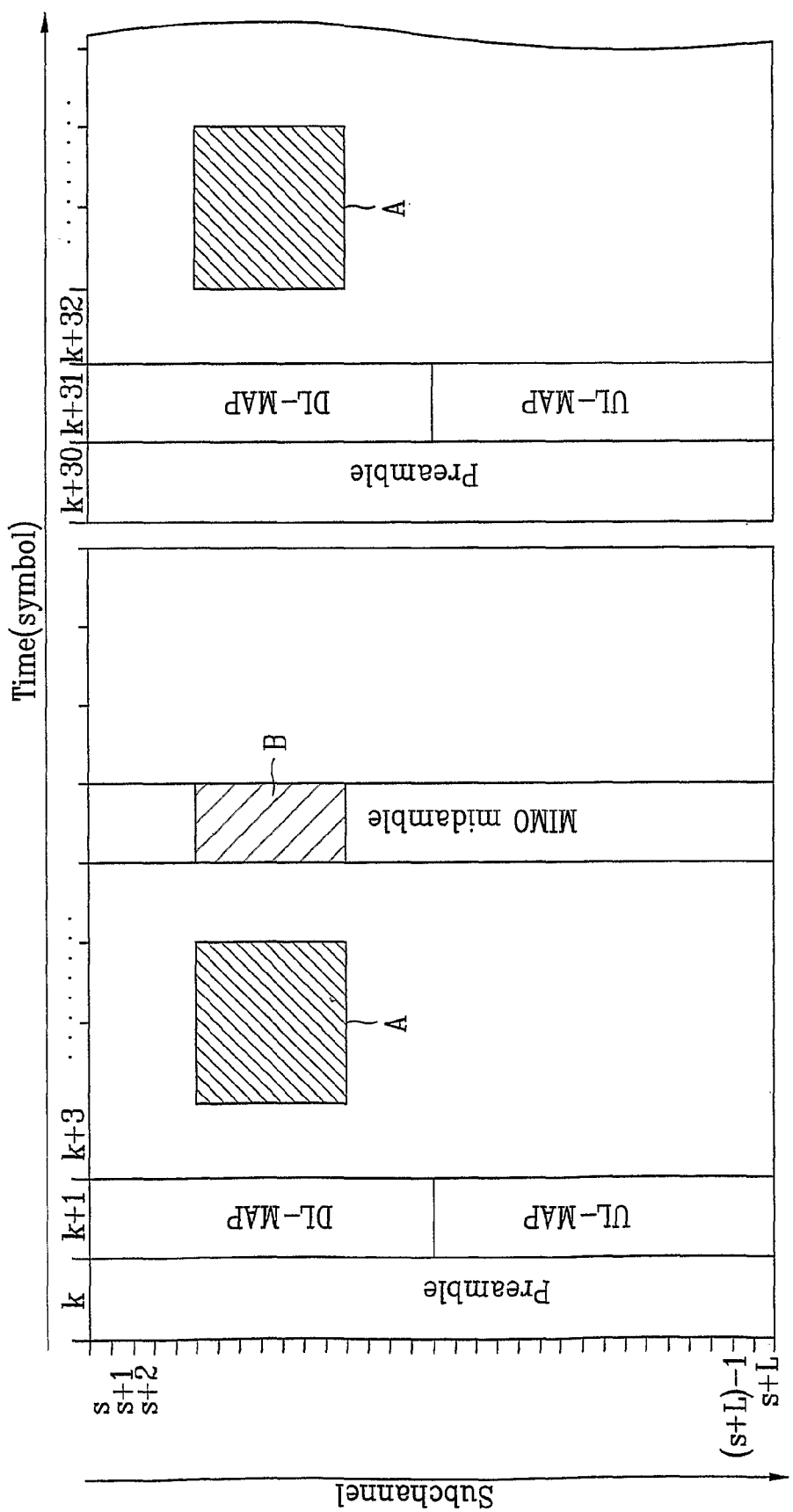
FIG. 3 is an exemplary diagram of a data frame in an OFDM or OFDMA radio communications system according to one preferred embodiment of the present invention.

In case that the base station designates the partial band of the preamble or midamble region as the signal measurement region, it is preferable that the partial band is set to the preamble or midamble region corresponding to the data transmission region allocated to the mobile subscriber station. FIG. 3 is an exemplary diagram of a data frame in an OFDM or OFDMA radio communications system according to one preferred embodiment of the present invention, in which a midamble region (part-'B' in FIG. 3) corresponding to a data transmission region (part-'A' in FIG. 3) allocated to the mobile subscriber station is designated as the partial band.

It is apparent that the method of transmitting the instruction information to the mobile subscriber station from the base station can employ various methods including the method of transmitting the instruction information included in the CQICH assignment IE. Meanwhile, instead of transmitting the instruction information, it is also possible to estimate the channel information by previously determining the signal measurement region as one of the data, preamble and midamble regions and by measuring the signal quality in the determined region.

The mobile subscriber station having received the instruction information estimates the channel information requested by 'Feedback type' in Table 1 by the base station based on the signal included in the preamble region (all or partial), the midamble region (all or partial) or the data transmission region allocated to the mobile subscriber station according to the contents of the signal measurement region instructed by the instruction information (see, for example, FIG. 5, S52 and S53). For instance, if the 'Feedback type' field in Table 1 is instructed as '000', a CINR carrier to interference and noise ratio) value as a channel measurement value of the signal measurement region instructed by the 'Signal for estimation' field is calculated to be fed back to the designated CQICH region (see, for example, FIG. 5, S54). If the 'Feedback type' field is '010', an amplitude and phase of a signal, which are channel estimation values of the instructed signal measurement region are fed back in a matrix form. In case of the MIMO system, if the 'Feedback type' is '001', a weight of each antenna is found by measuring the preamble or midamble region to be fed back. The above-explained feedback type is just exemplary. Accordingly, various feedback types measured or estimated by the mobile subscriber station according to a request from the base station can be fed back to the base station.

In case that the base station receives the CINR fed back from the mobile subscriber station, it is able to set an MCS (modulation and coding scheme) level according to the CINR value. Hence, a quantity of data transmitted to the mobile subscriber station can be determined according to the MCS level.

Since the region for the channel information estimation can be flexible varied according to a situation in the above-explained embodiments, it effectively applicable to the system (e.g., MIMO system, adaptive beamforming system, etc.) employing the antenna affected by the change of the region for the channel estimation.

According to another embodiment of the present invention, it is able to consider a method that a mobile subscriber station estimates channel information by a combination of signal quality measurement values measured from at least two of a pilot signal of a data region allocated to the mobile subscriber station, signals in preamble and midamble regions. Namely, after having measured all features of the pilot signal of the data region allocated to the mobile subscriber station and signals of the preamble and midamble regions, the mobile subscriber station estimates channel information by combining results of comparison between the measured values and the feature values of the previously known feature values of the pilot signal and the signals of the preamble and midamble regions.

Figure 4:
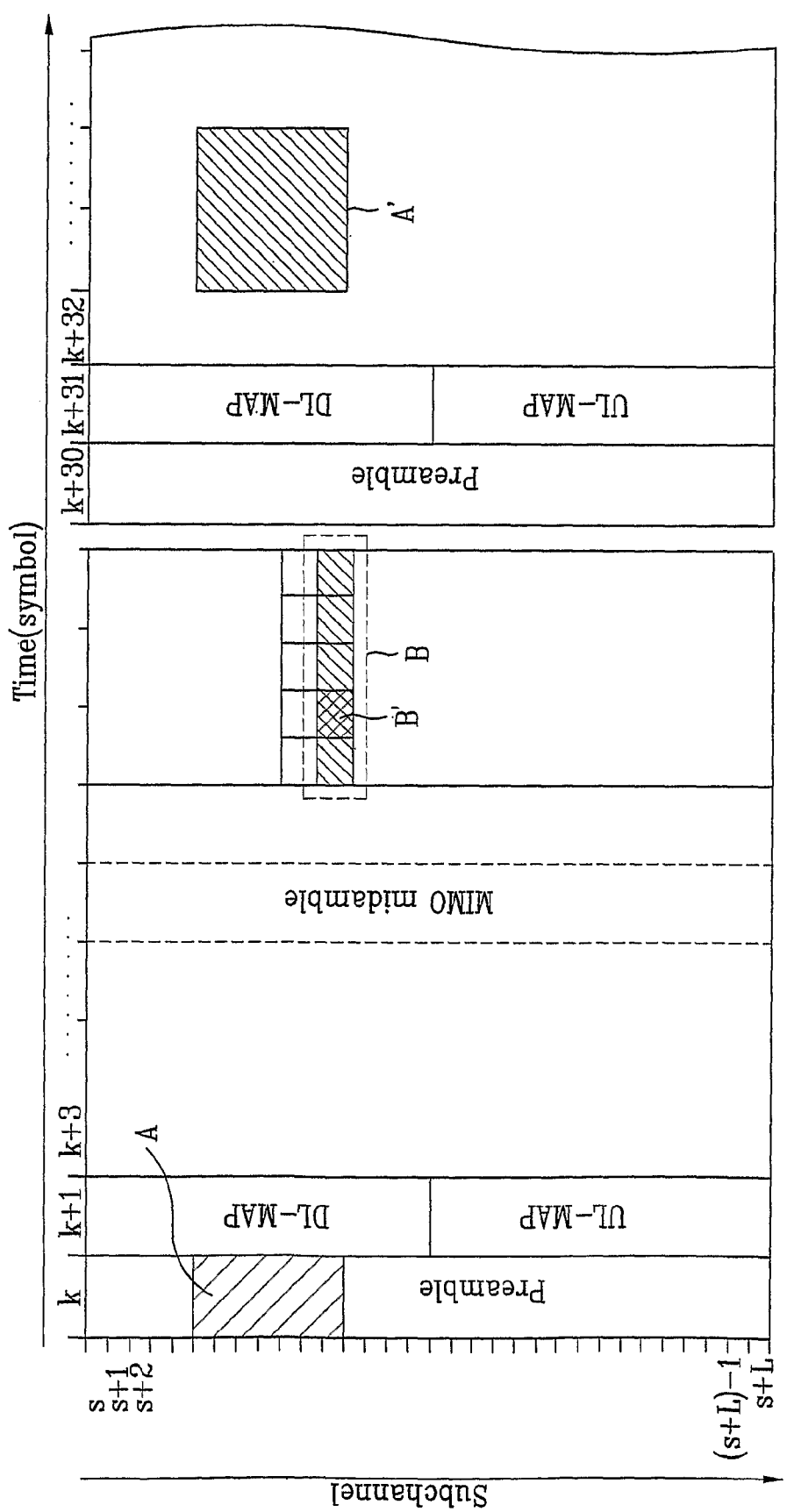
FIG. 4 is an exemplary diagram of a data frame in an OFDM or OFDMA radio communications system according to another preferred embodiment of the present invention.

FIG. 4 is an exemplary diagram of a data frame in an OFDM or OFDMA radio communications system according to another preferred embodiment of the present invention.

Referring to FIG. 4, in case of having data to be transmitted to a mobile subscriber station, a base station previously transmits instruction information instructing the mobile subscriber station of a data transmission band to be allocated to the mobile subscriber station to grasp a channel status of the data transmission band to be allocated to the mobile subscriber station prior to data transmission.

The instruction information instructing the transmission band to be allocated to the mobile subscriber station can be included in CQICH assignment IE to be transmitted to the mobile subscriber station. In particular, the instruction information instructing a preamble corresponding to a subchannel region of the transmission band to be allocated to the mobile subscriber station or a subchannel region (part-'A' in FIG. 4) of a midamble in the MIMO system is included in the CQICH assignment IE to be transmitted to the mobile subscriber station. Table 2 shows an example of a format of the CQICH assignment IE.

TABLE 2

| Syntax | Size (bits) | Notes |
| --- | --- | --- |
| CQICH_Enhanced_Alloc_IE( ) { | | |
| Extended DIUC | 4 | 0x09 |
| Length | 4 | Length in bytes of following fields |
| CQICH_ID | variable | Index to uniquely identify the CQICH resource assigned to the MSS |
| Period(=p) | 2 | A CQI feedback is transmitted on the CQICH every $2^p$ frames |
| Frame offset | 3 | The MSS starts reporting at the frame of which the number has |

TABLE 2-continued

| Syntax | Size (bits) | Notes |
|---|---|---|
| | | the same 3 LSB as the specified frame offset. If the current frame is specified, the MSS should start reporting in 8 frames. |
| Duration(=d) | 3 | A CQI feedback is transmitted on the CQI channels indexed by the CQICH_ID for $10 \times 2^d$ frames. If d==0, the CQICH is de-allocated. If d==111, the MSS should report until the BS command for the MSS to stop. |
| $N_T$ actual BS antennas | 3 | 001 = Reserved<br>010 = 2 actual antennas<br>011 = 3 actual antennas<br>100 = 4 actual antennas<br>101 = 5 actual antennas<br>110 = 6 actual antennas<br>111 = 7 actual antennas<br>000 = 8 actual antennas |
| Subchannel offset | 6 | The lowest index subchannel used for Preamble. |
| No. Subchannels | 6 | The number of Preamble subchannel. If data region exist, set '0'. |
| Feedback_type | 4 | 000 = Fast DL measurement/Default Feedback<br>001 = Precoding weight matrix information<br>010 = Channel matrix H<br>011 = MIMO mode and permutation zone<br>100 = Open loop precoding<br>101-111 = Reserved |
| CQICH_Num | 4 | Number of CQICHs assigned to this CQICH_ID is (CQICH_Num + 1) |
| for(I=0;i<CQICH_Num;i++)<br>{ | | |
| Allocation index | 6 | Index to the fast feedback channel region marked by UIUC = 0 |
| }<br>if((Feedback_type!=011)<br>&(!6-bit<br>CQICH)){<br>MIMO_permutation_feedback cycle} | 2 | This field exists only for 4-bit and 5-bit CQI payload.<br>00 = No MIMO and permutation mode feedback<br>01 = the MIMO and permutation mode indication shall be transmitted on the CQICH indexed by the CQICH_ID every 4 frames. The first indications sent on the 8th CQICH frame.<br>10 = the MIMO mode and permutation mode indication shall be transmitted on the CQICH indexed by the CQICH_ID every 8 frames. The first indication is sent on the 8th CQICH frames.<br>11 = the MIMO mode and permutation mode indication shall be transmitted on the CQICH indexed by the CQICH_ID every 16 frames. The first indication is sent on the 16th CQICH frame. |
| CQICH_Num | 4 | Number of CQICHs assigned to this CQICH_ID is (CQICH_Num + 1) |
| for(I=0;i<CQICH_Num;i++)<br>{ | | |

As mentioned in the foregoing description, the base station designates the channel quality information channel (CQICH) via the IE to receive a feedback of the measurement value for the downlink channel status of the designated region from the mobile subscriber station. In the present invention, if the base station previously informs the mobile subscriber station of the preamble or midamble region corresponding to the data transmission band for data transmission, the mobile subscriber station measures a status of the channel by the measurement of the signal included in the preamble or midamble region and then feeds back the measured status to the base station.

In order for the base station to inform the mobile subscriber station of the data transmission band, 'Subchannel offset' and 'No.subchannels' fields are added to the IE format to designate the CQICH in Table 2. The 'Subchannel offset' field is the information instructing a lowest one of subchannels of the preamble or midamble such as subchannels corresponding to the transmission band for the base station to transmit data and may be an index of the lowest subchannel for example. The 'No.Subchannels' field indicates the number of the subchannels corresponding to the transmission band. By the 'Subchannel offset' and 'No.subchannels' fields, the base station can designate the subchannels of the preamble or midamble such as the subchannels corresponding to the transmission band to transmit data. Alternatively, the base station can inform the mobile subscriber station of the transmission band to transmit data in various ways.

The mobile subscriber station measures the channel status of the transmission band to transmit data and then feeds back the measured status to the base station. In Table 2, items included in the 'Feedback type' field correspond to the values fed back to the base station from the mobile subscriber station. The base station decides whether to transmit data on the data transmission band according to the fed-back values. For instance, if the value fed back to the base station is better than the channel information previously received from the mobile subscriber station by comparison, it is applied to a data transmission region (part-'A' in FIG. 4) of a next frame to be transmitted. If the value fed back to the base station is worse than the channel information previously received from the mobile subscriber station by comparison, another data transmission band is allocated and the data transmission band is determined through the same process.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to such a wireless mobile communications system as a broadband wireless access system using OFDM or OFDMA.

The invention claimed is:

1. A method of receiving channel information at a base station in an OFDM (orthogonal frequency division multiplexing) or OFDMA (orthogonal frequency division multiple access) wireless communications system, the method comprising:

transmitting, by the base station, an information element (IE) to a mobile subscriber station, the IE comprising instruction information and a feedback type, wherein the instruction information indicates a signal measurement region selected among a data region allocated to the mobile subscriber station, a preamble region, and a midamble region within a data frame, and wherein the feedback type indicates a type of the channel information to be received from the mobile subscriber station;

transmitting, by the base station, the data frame to the mobile subscriber station, wherein the data frame comprises the data region allocated to the mobile subscriber station, the preamble region and the midamble region; and receiving, by the base station, the channel information from the mobile subscriber station, the channel information estimated by the mobile subscriber station using signals transmitted on the indicated signal measurement region in accordance with the feedback type, wherein, when a partial band of the preamble region or the midamble region is selected as the signal measurement region, the instruction information comprises a first field indicating a lowest subchannel index of the partial band and a second field indicating a number of subchannels of the partial band.

2. The method of claim 1, wherein the IE is a channel quality information channel (CQICH) allocation IE.

3. The method of claim 1, wherein the instruction information indicates a portion of the preamble region as the signal measurement region.

4. The method of claim 1, wherein the instruction information indicates the whole preamble region as the signal measurement region.

5. The method of claim 1, wherein the instruction information indicates a portion of the midamble region as the signal measurement region.

6. The method of claim 1, wherein the instruction information indicates the whole midamble region as the signal measurement region.

7. The method of claim 3, wherein the portion of the preamble region is a part of the preamble region corresponding to a channel band within which data is transmitted to the mobile subscriber station.

8. A method of transmitting channel information at a mobile subscriber station in an OFDM (orthogonal frequency division multiplexing) or OFDMA (orthogonal frequency division multiple access) wireless communications system, the method comprising:

receiving, by the mobile subscriber station, an information element (IE) from a base station, the IE comprising instruction information and a feedback type, wherein the instruction information indicates a signal measurement region selected among a data region allocated to the mobile subscriber station, a preamble region, and a midamble region within a data frame, and wherein the feedback type indicates a type of the channel information to be transmitted by the mobile subscriber station;

receiving, by the mobile subscriber station, the data frame, wherein the data frame comprises the data region allocated to the mobile subscriber station, the preamble region and the midamble region;

estimating, by the mobile subscriber station, the channel information based on signals received on the indicated signal measurement region in accordance with the feedback type; and transmitting, by the mobile subscriber station, the estimated channel information to the base station, wherein, when a partial band of the preamble region or the midamble region is selected as the signal measurement region, the instruction information comprises a first field indicating a lowest subchannel index of the partial band and a second field indicating a number of subchannels of the partial band.

9. The method of claim 8, wherein the IE is a channel quality information channel (CQICH) allocation IE.

10. The method of claim 8, wherein the instruction information indicates a portion of the preamble region as the signal measurement region.

11. The method of claim 10, wherein the portion of the preamble region is a part of the preamble region corresponding to a channel band within which data is received by the mobile subscriber station.

12. The method of claim 8, wherein the instruction information indicates the whole preamble region as the signal measurement region.

13. The method of claim 8, wherein the instruction information indicates a portion of the midamble region as the signal measurement region.

14. The method of claim 8, wherein the instruction information indicates the whole midamble region as the signal measurement region.

* * * * *